United States Patent
Kress et al.

(10) Patent No.: US 9,223,152 B1
(45) Date of Patent: Dec. 29, 2015

(54) AMBIENT LIGHT OPTICS FOR HEAD MOUNTED DISPLAY

(71) Applicant: Google Inc., Mountain View, CA (US)

(72) Inventors: Bernard Kress, Redwood City, CA (US); Thad E. Starner, Atlanta, GA (US)

(73) Assignee: Google Inc., Mountain View, CA (US)

( * ) Notice: Subject to any disclaimer, the term of this patent is extended or adjusted under 35 U.S.C. 154(b) by 335 days.

(21) Appl. No.: 13/769,197

(22) Filed: Feb. 15, 2013

(51) Int. Cl.
- G02B 27/00 (2006.01)
- G02F 1/01 (2006.01)
- G01J 1/42 (2006.01)
- G02B 27/01 (2006.01)
- G02F 1/13 (2006.01)
- G02F 1/25 (2006.01)

(52) U.S. Cl.
CPC .............. G02F 1/01 (2013.01); G01J 1/4204 (2013.01); G02B 27/0172 (2013.01); G02F 1/1313 (2013.01); G02F 1/25 (2013.01)

(58) Field of Classification Search
CPC .............. G06F 3/013; G02B 27/017; G02B 2027/0174
USPC ............ 250/221, 216, 214 AL, 214 B; 345/8, 345/156; 359/13, 15
See application file for complete search history.

(56) References Cited

U.S. PATENT DOCUMENTS

| | | |
|---|---|---|
| 6,124,954 A | 9/2000 | Popovich et al. |
| 6,646,636 B1 | 11/2003 | Popovich et al. |
| 6,661,495 B1 | 12/2003 | Popovich |
| 8,233,204 B1 | 7/2012 | Robbins et al. |
| 8,639,072 B2 | 1/2014 | Popovich et al. |
| 2001/0024177 A1* | 9/2001 | Popovich .......................... 345/8 |
| 2004/0108971 A1 | 6/2004 | Waldern et al. |
| 2014/0226096 A1* | 8/2014 | Taheri et al. .................... 349/33 |

FOREIGN PATENT DOCUMENTS

EP 2447787 A1 5/2012

* cited by examiner

Primary Examiner — Kevin Pyo
(74) Attorney, Agent, or Firm — Blakely Sokoloff Taylor & Zafman LLP (57) ABSTRACT

A head mounted display ("HMD") includes a display module, an eyepiece, a switchable hologram, and a controller. The display module is configured for launching CGI light along a forward propagating path. The eyepiece is optically coupled to receive the CGI light and direct the CGI light to an eyeward region of the eyepiece. The switchable hologram is disposed along a surface of the eyepiece and the switchable hologram is configured to redirect ambient light propagating toward the eyepiece, when activated. The controller is coupled to the switchable hologram to activate and deactivate the switchable hologram.

19 Claims, 6 Drawing Sheets

AMBIENT LIGHT OPTICS FOR HEAD MOUNTED DISPLAY

TECHNICAL FIELD

This disclosure relates generally to optics, and in particular but not exclusively, relates to head mounted displays.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves. However, some applications for HMDs may be limited due to undesirable ambient light being directed into the eye of a user of an HMD. As examples undesirable ambient light being directed into the eye of a user may cause eye fatigue, image "ghosting," or CGI contrast challenges in high brightness environments.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for redirecting ambient light propagating toward an eyepiece of an HMD are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
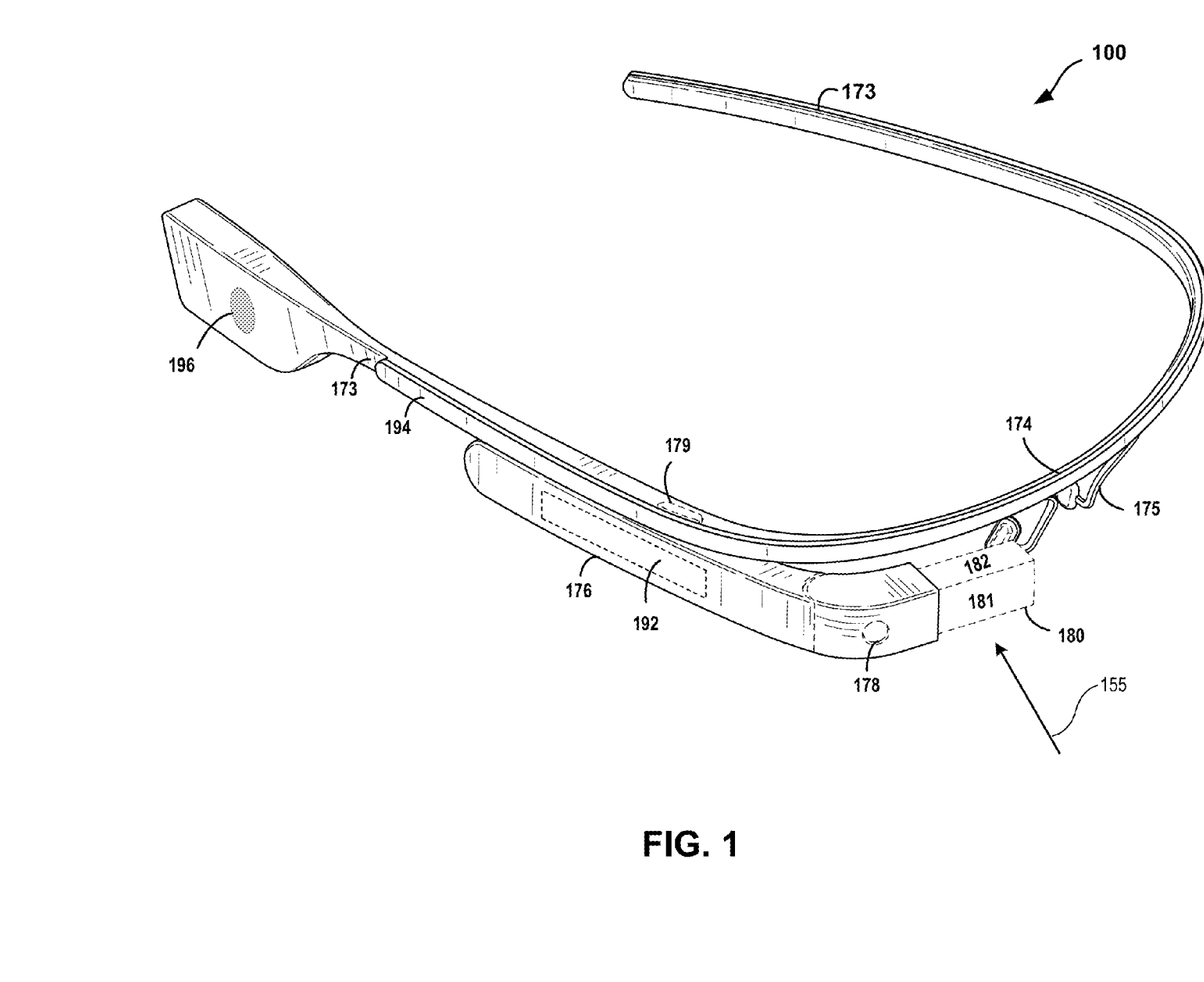
FIG. 1 illustrates a head mounted display ("HMD") including an eyepiece, in accordance with an embodiment of the disclosure.

FIG. 1 illustrates a head mounted display ("HMD") 100 including an eyepiece 180, in accordance with an embodiment of the disclosure. Example HMD 100 is a monocular HMD. HMD 100 includes side-arms 173, a center frame support 174, and a bridge portion with nosepiece 175. In the example embodiment shown in FIG. 1, center frame support 174 connects the side-arms 173. HMD 100 does not include lens-frames containing lens elements in the illustrated embodiment, but other embodiments may include lens elements. An HMD is a display device worn on or about the head. Although FIG. 1 illustrates a specific monocular HMD 100, embodiments of the present invention are applicable to a wide variety of frame types and styles (e.g. visor, headband, goggles).

The illustrated embodiment of HMD 100 is capable of displaying an augmented reality to the user. Eyepiece 180 may permit the user to see a real world image via external scene light 155 in additional to display light (having CGI) generated by a display module. In this case, eyepiece 180 may be referred to as an "optical combiner" because it may present both external scene light and computer generated display light to an eye of a user. As a result, after the CGI light field is collimated, the display light may be seen by the user as a virtual image superimposed over the real world as an augmented reality.

HMD 100 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. Component housing 176 may include light sources (not shown) for a display module that sends CGI light toward eyepiece 180 and/or optical elements (not shown) to direct light from the light sources to the display 180. As such, eyepiece 180 may include optical features that direct light that is generated by such light sources towards the wearer's eye, when HMD 100 is being worn. In the illustrated embodiment, eyepiece 180 is roughly shaped as a three-dimensional rectangle with a top side 182, a front scene-side 181, a back eye-ward side 183 (not visible), a bottom side 184, (not visible), and an end side 185 (not visible). The back eye-ward side 183 is opposite the front scene-side 181 and the bottom side 184 is opposite the top side 182. Top side 182, front scene-side 181, back eye-ward side 183, bottom side 184, and end side 185 make up an external surface of eyepiece 180.

Figure 2:
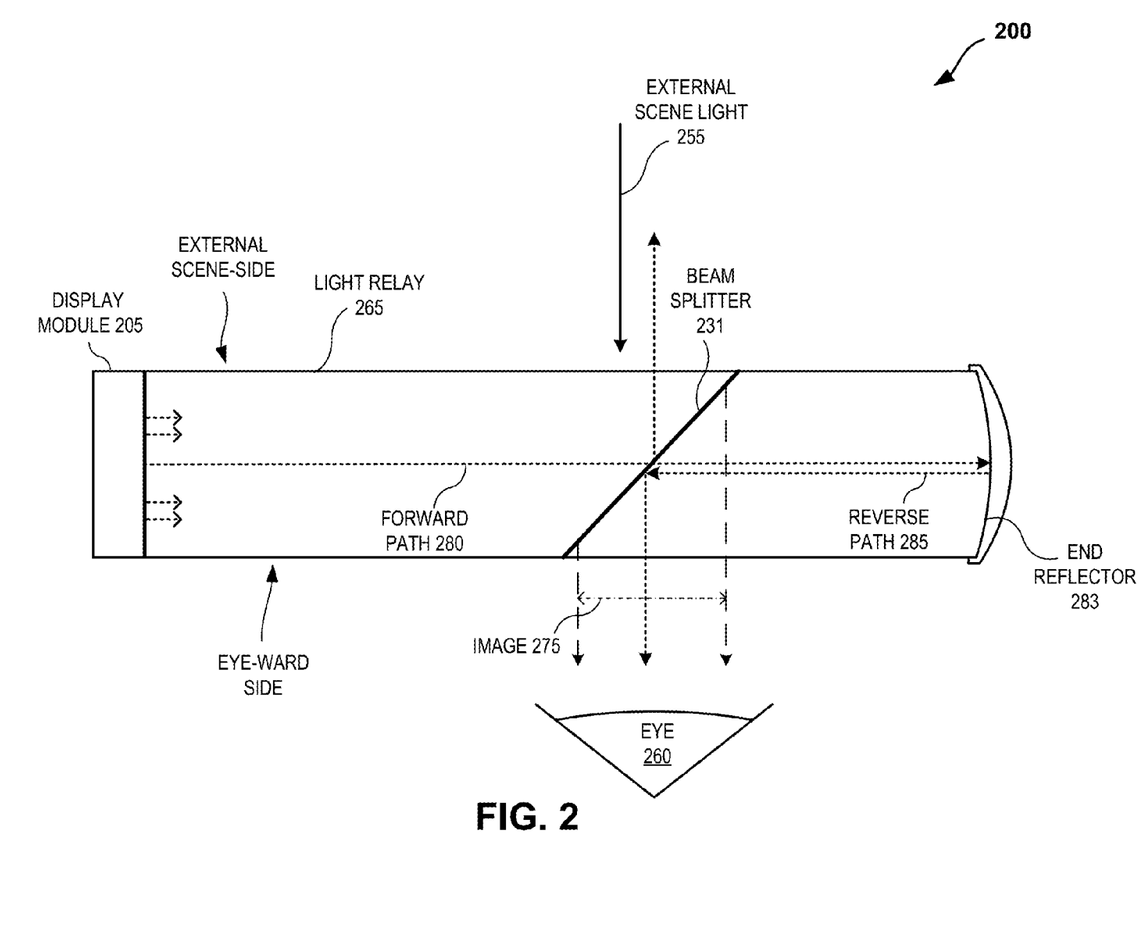
FIG. 2 illustrates a top cross-section view of an example eyepiece that directs external scene light and computer generated images ("CGI") toward an eye-ward region of the eyepiece, in accordance with an embodiment of the disclosure.

FIG. 2 illustrates a top cross-section view of an example eyepiece 200 that directs external scene light 255 and computer generated images ("CGI") toward an eye-ward region of the eyepiece, in accordance with an embodiment of the disclosure. Eyepiece 200 is an example eyepiece that could be used as eyepiece 180. It is appreciated that eyepiece 200 is only one example embodiment of an eyepiece that could be used to direct both CGI light and external scene light 255 to an eye 260 of a user.

Eyepiece 200 includes a display module 205, a light relay 265, a beam splitter 231, and an end reflector 283. Display module 205 may be implemented by a light emitting diode ("LED") array, an organic LED ("OLED") array, a quantum dot array, or otherwise. Display module 205 may also be implemented by a light source (e.g. laser, LED, or bulb) backlighting an LCD display or a liquid crystal on silicon ("LCOS") panel reflecting a light source. End reflector 283 may be a concave mirror or a Fresnel or diffractive reflector.

In operation, display module 205 launches display light (which may be CGI light) along a forward path 280 toward end reflector 283. Light relay 265 may have a transparent structure to permit the display light to pass through along forward path 280. Light relay 265 may be fabricated of a solid transparent material (e.g., glass, quartz, acrylic, clear plastic, PMMA, ZEONEX-E48R, etc.) or be implemented as a solid housing having an inner air gap through which the display light passes. Light relay 265 may operate to protect the optical path, but may not necessarily use total internal reflection ("TIR") to guide or confine the display light.

Along forward path 280, the display light encounters beam splitter 231. Beam splitter 231 reflects a first portion of the display light towards the external scene-side of eyepiece 200 and passes a second portion of the display light. In one embodiment, beam splitter 231 is a 45 degree 50/50 non-polarizing beam splitter, meaning it reflects 50 percent of light and passes the other 50 percent of light. The display light passed by beam splitter 231 continues along forward path 280 and end reflector 283 reflects back the display light along a reverse path 285. The display light along reverse path 285 encounters beam splitter 231, which reflects a portion of the display light along reverse path 285 toward an eye-ward side of eyepiece 100. The illustrated embodiment of FIG. 2 allows the display light launched by display module 205 to be projected into eye 260 of a user, which is how image 275 is directed to eye 260. In addition to directing image 275 into eye 260, eyepiece 200 may also allow at least a portion of external scene light 255 to reach eye 260 (after a portion is reflected by beam splitter 231). In this case, eyepiece 200 may be referred to as an "optical combiner."

While using HMD 100 with eyepiece 200, undesirable ambient light may be directed into eye 260 of a user of an HMD. For example, ambient light propagating at certain angles may enter light relay 265 and be directed to eye 260 via end reflector 283 and/or beam splitter 231. The undesirable ambient light that is directed to eye 260 may cause contrast challenges for the user viewing the display light. The undesirable ambient light that is directed to eye 260 may also cause unintended "ghost" images to be presented to eye 260. There may be two types of ghost images, one stemming from the display (reversed image or double image, etc.) and parasitic images stemming from the outside world. The disclosed embodiments may reduce or eliminate both types of ghost images. The unintended ghost images can be annoying, depending on the context. To address these possible issues, surfaces (e.g. the top side) of light relay 265 may have a diffuse surface. However, the diffuse surface may still allow the unintended "ghost" images to be presented to eye 260. But, applying a stronger diffuse surface that further depletes and diffuses the ambient light may negatively impact a user's viewing experience by creating a tunnel vision effect.

Figure 3:
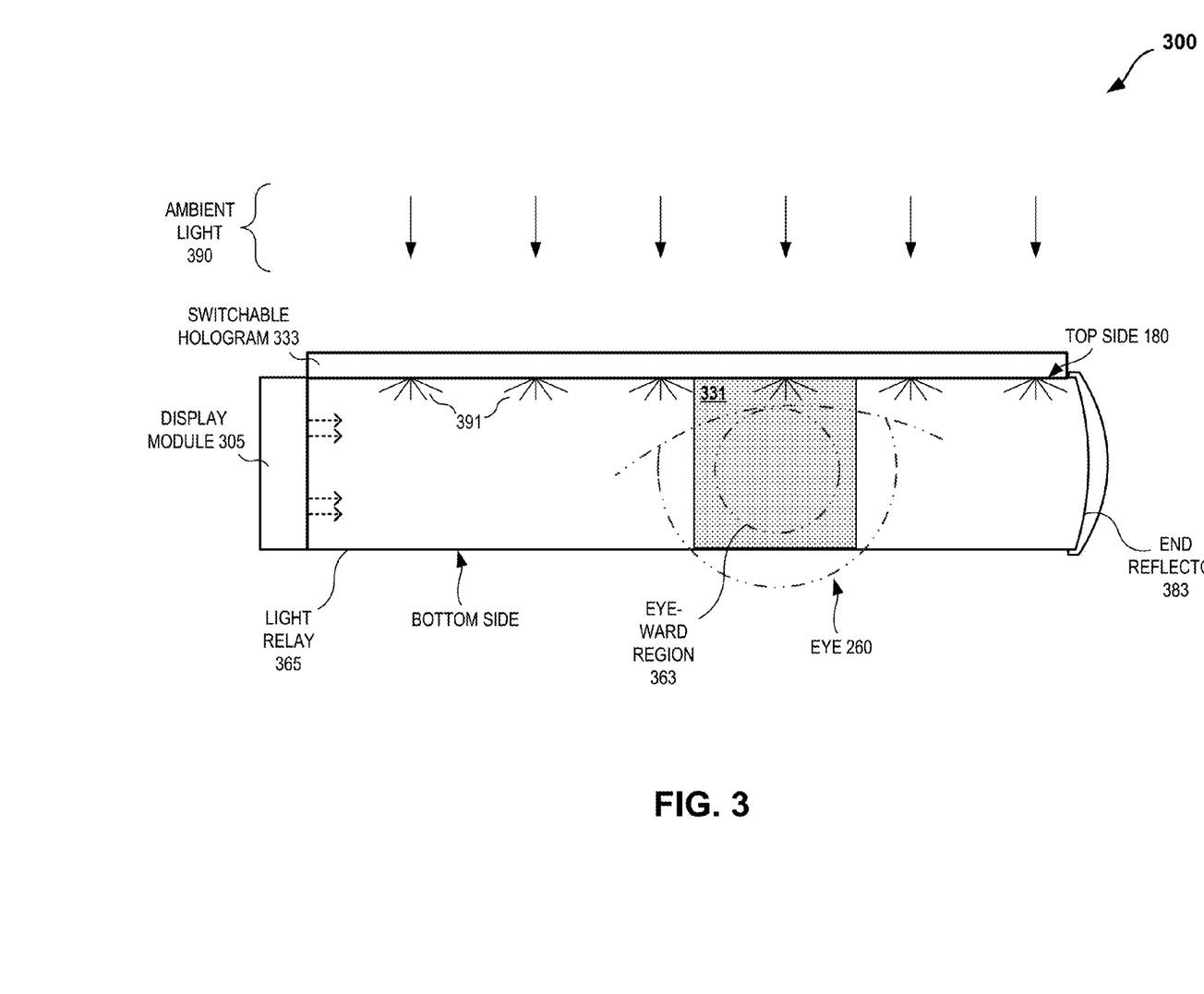
FIG. 3 illustrates a front view of an example eyepiece and a switchable hologram coupled to redirect ambient light propagating toward the eyepiece, in accordance with an embodiment of the disclosure.

FIG. 3 illustrates a front view of an example eyepiece 300, in accordance with an embodiment of the disclosure. Eyepiece 300 is an example eyepiece that could be used as eyepiece 180. Eyepiece 300 is coupled to receive CGI light from display module 305 and direct the CGI light to an eye-ward region of the eyepiece. Display module 305 may launch the CGI light along a forward propagating path toward end reflector 383. End reflector 383 may collimate and reflect the CGI light along a reverse propagating path. Beam splitter 331 may then reflect the CGI light propagating along the reverse propagating path toward an eye-ward region of eyepiece 300. An abbreviated dashed line depicts eye 260 in an example position in relation to eyepiece 300. Eye-ward region 363 is one example of an eye-ward region where the CGI light may be directed by beam splitter 331. It is understood that beam splitter 331 may be configured to direct CGI light in an eye-ward direction, even when it is not in proximity to an eye of a user.

A switchable hologram 333 is coupled outside an external surface of eyepiece 300 to redirect ambient light 390 propagating toward eyepiece 300. Specifically, in the illustrated embodiment, switchable hologram 333 is coupled above a top side (similar to top side 182) of eyepiece 300. In the illustrated embodiment, switchable hologram 333 is configured to diffuse ambient light 390 into diffuse ambient light 391, when activated.

Using conventional techniques that include creating interference patterns between a reference beam and a second beam, holograms (that may include optical patterns including diffractive gratings) may be "written" or "recorded" into photoactive holographic mediums such as silver-halide, photopolymer, or otherwise. The interference patterns may be calculated in software before translating them into the holographic medium. The resulting holograms may be designed to be transmissive or reflective. The holograms may diffuse light or direct light in pre-defined patterns based on precise engineering of diffraction angles written into a holographic medium. In some embodiments, the holograms may only affect a specified spectrum of light. Holographic mediums are available from DuPont™ and other companies.

In addition to static holograms, switchable holograms exist that allow holograms to be switched on and off by electronic control. While a switchable hologram is activated (switched on), it affects light according to the hologram recorded in the holographic medium. However, while the switchable hologram is deactivated (switched off), the switchable holographic grating may appear virtually transparent to light that encounters the switchable hologram. When the switchable hologram is switched off, it may slightly affect the light that encounters it because of an index of refraction change associated with the holographic medium. Some switchable hologram technologies may allow the switchable hologram to be activated to varying levels between on and off.

One switchable hologram technology is known as holographic polymer dispersed liquid crystal ("H-PDLC"). As a brief overview, H-PDLC technology uses electrical stimulation to align liquid crystals (mixed with a photoactive hologram medium) to form holograms. The electrical stimulation may then reset the liquid crystals to appear essentially transparent, such that the liquid crystals are no longer forming diffractive gratings. H-PDLC technology may be switchable from on to off in 50 us or faster, for example. It is appreciated that in the case of an H-PDLC switchable hologram, the hologram may be deactivated (switched off) when voltage is applied and be activated (switched on) in the absence of voltage, and thus act as a static hologram.

Using the above referenced techniques and technology, switchable hologram 333 may be configured to diffuse ambient light 390, when activated, and appear essentially transparent to ambient light 390, when deactivated. In addition, switchable hologram 333 may be activated at different activation levels to modulate different levels of diffusion, for example. Activating different activation levels may include modulating a voltage level across the liquid crystals in an H-PDLC. The different voltage levels may cause the liquid crystals to vary their degree of alignment, which may modulate the extent to which ambient light 390 is diffused.

Figure 4:
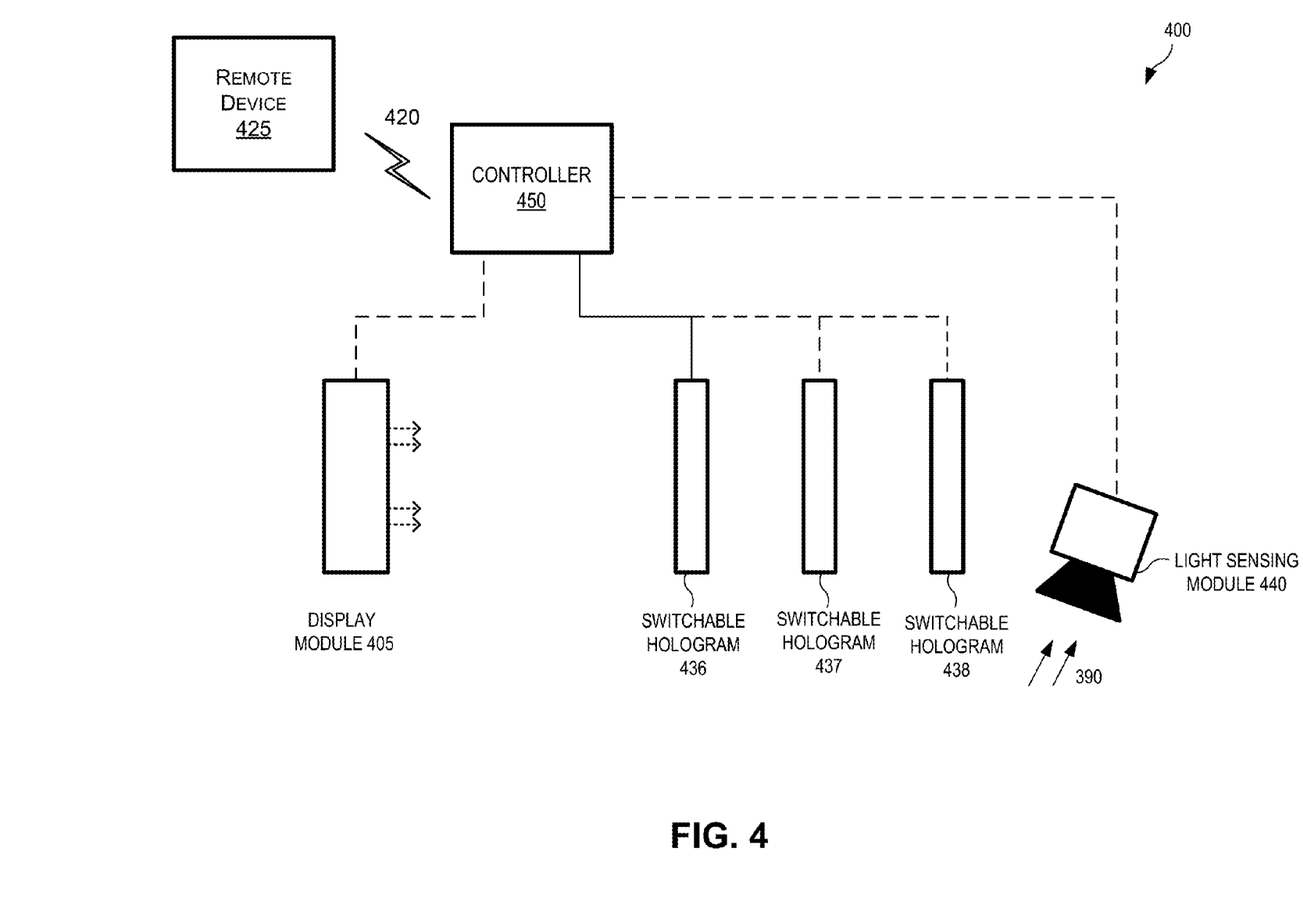
FIG. 4 illustrates an example HMD control system for controlling one or more switchable holograms, in accordance with an embodiment of the disclosure.

FIG. 4 illustrates an example block diagram schematic diagram of an HMD system 400 for controlling one or more switchable holograms, in accordance with an embodiment of the disclosure. HMD system 400 includes a controller 450 coupled to a display module 405, switchable holograms 436, 437, and 438, and a light sensing module 440, in accordance with an embodiment of the disclosure. HMD system 400 may be disposed within an HMD, such as HMD 100.

In the illustrated embodiment, controller 450 is optionally coupled (as notated by the dashed lines) to control the display light displayed by display module 405. Controller 450 may include logic circuitry such as a processor, a field-programmable gate array ("FPGA"), or otherwise. Controller 450 may also include a memory coupled to a processor. The memory may store images, user settings, and firmware/software that can be accessed and executed by the processor, for example. Controller 450 may be disposed within component housing 176 of HMD 100.

Controller 450 may be connected to a network to receive and transmit information. In the illustrated embodiment, HMD system 400 communicates using a communication link 420 (e.g., a wired or wireless connection) to a remote device 425, which may be a server. Controller 450 may receive data from remote device 425, and configure the data for display with display module 405. Remote device 425 may be any type of computing device or transmitter including a laptop computer, a mobile telephone, or tablet computing device, etc., that is configured to transmit data to HMD system 400. Remote device 425 and HMD system 400 may contain hardware to enable the communication link 420, such as processors, transmitters, receivers, antennas, etc. Further, remote device 425 may take the form of or be implemented in a computing system that is in communication with and configured to perform functions on behalf of a client device, such as HMD system 400. Such a remote device 425 may receive data from another HMD system 400, perform certain processing functions on behalf of HMD system 400, and then send the resulting data back to HMD system 400. This functionality may be referred to as "cloud" computing.

In FIG. 4, communication link 420 is illustrated as a wireless connection; however, wired connections may also be used. For example, the communication link 420 may be a wired serial bus such as a universal serial bus or a parallel bus. A wired connection may be a proprietary connection as well. The communication link 420 may also be a wireless connection using, e.g., Bluetooth® radio technology, communication protocols described in IEEE 802.11 (including any IEEE 802.11 revisions), Cellular technology (such as GSM, CDMA, WiMAX, or LTE), or Zigbee® technology, among other possibilities. The remote device 425 may be accessible via the Internet and may include a computing cluster associated with a particular web service (e.g., social-networking, photo sharing, address book, etc.).

In FIG. 4, controller 450 is coupled to control turning on (activating) and turning off (deactivating) switching hologram 436. Controller 450 may also be optionally coupled (notated by the dashed line) to control activating and deactivating switchable holograms 437 and 438. Switchable hologram 333 may be one example of switchable hologram 436. Controller 450 may be coupled to activate switchable hologram 436 at different activation levels to modulate different levels of diffusion. Also in the illustrated embodiment, controller 450 is optionally coupled to light sensing module 440. Light sensing module 440 may be positioned on HMD 100 to sense ambient light 390. Light sensing module 440 may measure ambient light and report light data to controller 450. Controller 450 may be coupled to activate and deactivate switchable holograms 436, 437, and 438 in response to the light data generated by light sensing 440. Light sensing module 440 may be configured to measure selected spectrums of light. Light sensing module 440 may include an image sensor, a photodiode with associated color filters, or other light sensing component. In one embodiment, image capture device 178 may be used as light sensing module 440.

Referring back to FIG. 3, in some contexts, ambient light 390 may include very bright image light from a user's surrounding. For example, ambient light 390 may be very bright if it includes sunlight reflected off of a glass building or light from a car's headlight. As mentioned above, the undesirable ambient light may cause contrast challenges and/or ghosting. Switchable hologram 333, when activated, may diffuse ambient light 390 and prevent it from entering the viewer's eye box, thus working as a dimmer. However, in addition to dimming ambient light 390, a hologram can also shape the spectrum of the light (dimming more specific regions of the spectrum than others, in essence acting as a spectral filter). The effect used here is the spectral Bragg selectivity of volume holograms. Such a switchable hologram can thus act as both a dimmer (with functionality similar to electrochromic or photochromic dimming) and also as a spectral filter in order to balance the color so that the display can be seen with the best color contrast on the field. For example, if the field is green and the display is green, the holographic diffuser to be activated can dim the green portion of the field so that the augmented reality display will have a better color contrast against the field. For dimming and color shaping, the hologram will have a very wide angular bandwidth (working over a very larger angular range). For ghost images reduction, the hologram may work under a narrow angular bandwidth, so that only light coming from specific regions of the field may be dimmed or diffused. The (relatively) narrow angular bandwidth can be implemented via the natural angular Bragg selectivity of volume holograms. This may prevent ghost images from being presented to eye 260 because diffused ambient light 391 may not include recognizable images for presentation to eye 260. In addition, switchable hologram 333 may be configured to diffuse ambient light 390 such that the light is diffused at angles that encourage diffuse ambient light 391 to exit light relay 365. In other words, the ambient light 391 may be directed out of light relay 365 at angles of incidence smaller than a critical angle of light relay 365 to avoid the occurrence of total internal reflection ("TIR") because TIR may trap the ambient light in light relay 365 and that trapped light may eventually be directed into eye 260. To discourage the occurrence of TIR for diffused ambient light 391, an index of refraction of light relay 365 may be considered when designing and configuring switchable hologram 333.

Light sensing module 440 may measure ambient light 390 and controller 450 may activate switchable hologram 333 to modulate a level of diffusing of ambient light 390. For example, in high brightness contexts (outdoors), switchable hologram 333 may be activated to a relatively high level of diffusion in response to light sensing module 440 measuring a high brightness environment. In low brightness, switchable hologram 333 may be activated to a relatively low level of diffusion (or even virtually no diffusion) in response to light sensing module 440 measuring a low brightness environment. Switchable hologram 333 may also be momentarily modulated to a relatively high level of diffusion if light sensing module 440 measures a suddenly high brightness level (e.g. glare off of a glass building) of ambient light 390.

Figure 5:
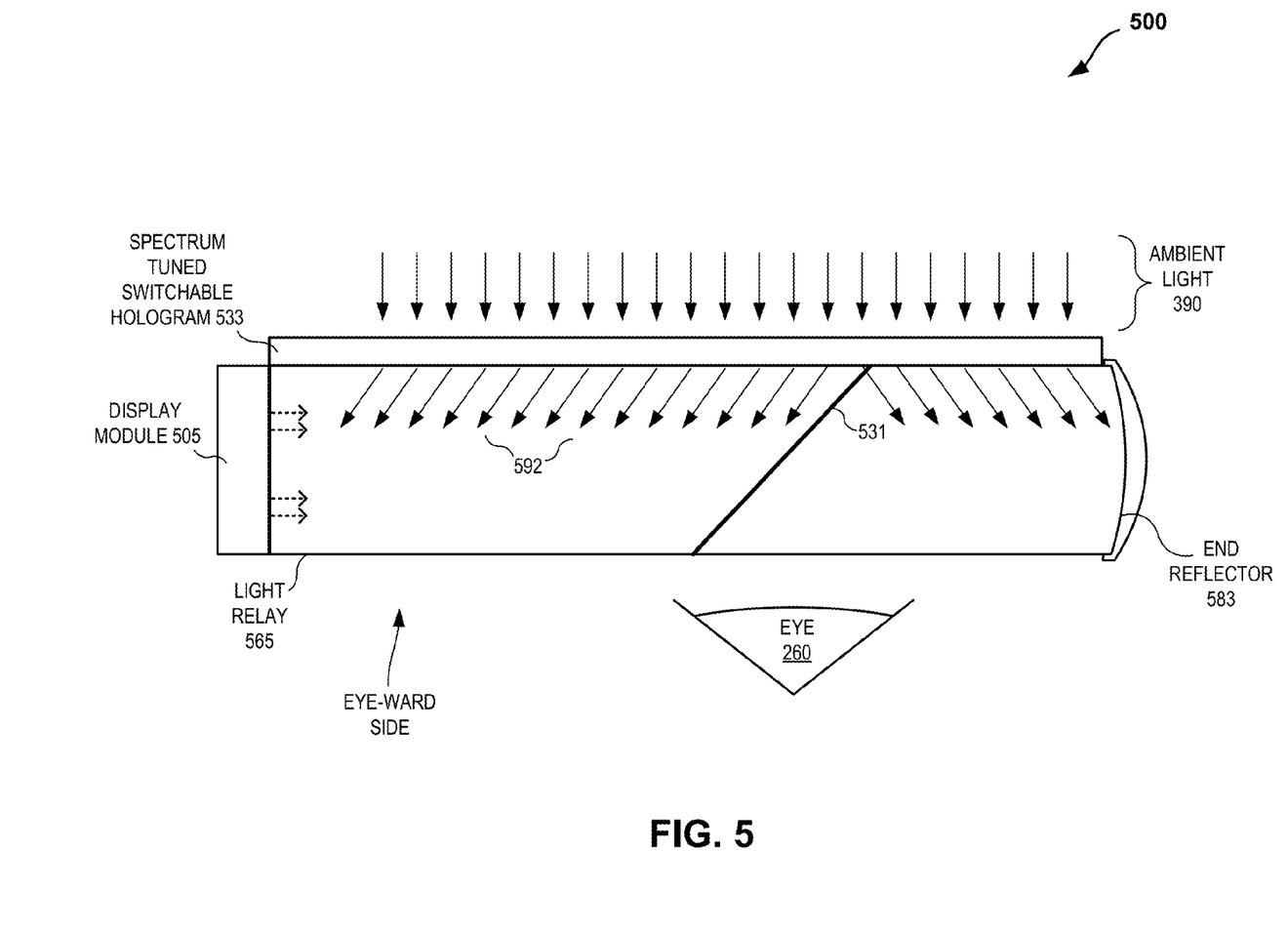
FIG. 5 illustrates a top cross-section view of an example eyepiece and a switchable hologram coupled to redirect ambient light propagating toward the eyepiece, in accordance with an embodiment of the disclosure.

FIG. 5 illustrates a top cross-section view of an example eyepiece 500 and a switchable hologram 533 coupled to redirect ambient light 390 propagating toward eyepiece 500, in accordance with an embodiment of the disclosure. Eyepiece 500 is an example eyepiece that could be used as eyepiece 180. Eyepiece 500 is coupled to receive CGI light from display module 505 and direct the CGI light to an eye-ward region of the eyepiece. Display module 505 may launch the CGI light along a forward propagating path toward end reflector 583. End reflector 383 may collimate and reflect the CGI light along a reverse propagating path. Beam splitter 531 may then reflect the CGI light propagating along the reverse propagating path toward an eye-ward region of eyepiece 500.

Switchable hologram 533 is coupled outside an external surface of eyepiece 500 to redirect ambient light 390 propagating toward eyepiece 500. In the illustrated embodiment, switchable hologram 533 is coupled in front of an external scene-side (similar to front scene-side 181) of eyepiece 500, although it could be coupled over different or additional sides of eyepiece 500. In the illustrated embodiment, switchable hologram 533 is configured to divert a selected spectrum of ambient light 390 away from an eye-ward region of eyepiece 500, when activated. Switchable hologram 533 may be controlled by controller 450, as discussed above and switchable hologram 533 may be one example of switchable hologram 436 that is controlled by controller 450.

In one embodiment, switchable hologram 533 is configured to divert a selected visible spectrum of light in a pattern away from an eye-ward region of eyepiece 500. Ultraviolet light (from computer monitors or displays, for example) may cause eye fatigue and it may be advantageous to avoid directing ultraviolet light into an eye 260. In one embodiment, the selected visible spectrum of light is ultraviolet light. In one embodiment, controller 450 activates and deactivates switchable hologram 533 in response to ambient light data generated by light sensing module 440. When light sensing module 440 reports measuring a threshold value of a selected visible spectrum (e.g. ultraviolet) of ambient light 390, controller 450 may activate or deactivate switchable hologram 533 in response to the reported measured threshold value. Therefore, switchable hologram 533 may divert an unwanted selected spectrum of ambient light 390 away from eye 260 as diverted ambient light 592.

In addition, switchable hologram 533 may be configured to diffuse ambient light 390 such that the light is diverted at angles that encourage diverted ambient light 592 to exit light relay 565. In other words, the diverted ambient light 592 may be directed out of light relay 565 at angles of incidence smaller than a critical angle of light relay 565 to avoid the occurrence of total internal reflection ("TIR").

In some embodiments, switchable holograms 333 and 533 may both be disposed over the same surface region of an eyepiece of HMD 100 and controller 450 may selectively activate switchable holograms 333 and 533 according to the same or separate inputs (e.g. data from light sensing module 440). In one embodiment, 20 um of a transparent dielectric substrate (e.g. glass) is layered between switchable holograms 333 and 533 to isolate them electrically. In one embodiment, 20 um of a transparent dielectric substrate (e.g. glass) is layered between switchable hologram 533 and another switchable hologram (not shown) that is configured to divert a selected spectrum of ambient light 390 away from eye 260.

In some cases, there might not be the need to produce a switchable hologram, but rather a static volume hologram, the natural angular and spectral Bragg selectivity of static volume holograms might be sufficient to implement the light diffusing/redirecting and spectral shaping tasks for a fixed set of conditions (angular and spectral conditions).

Figure 6:
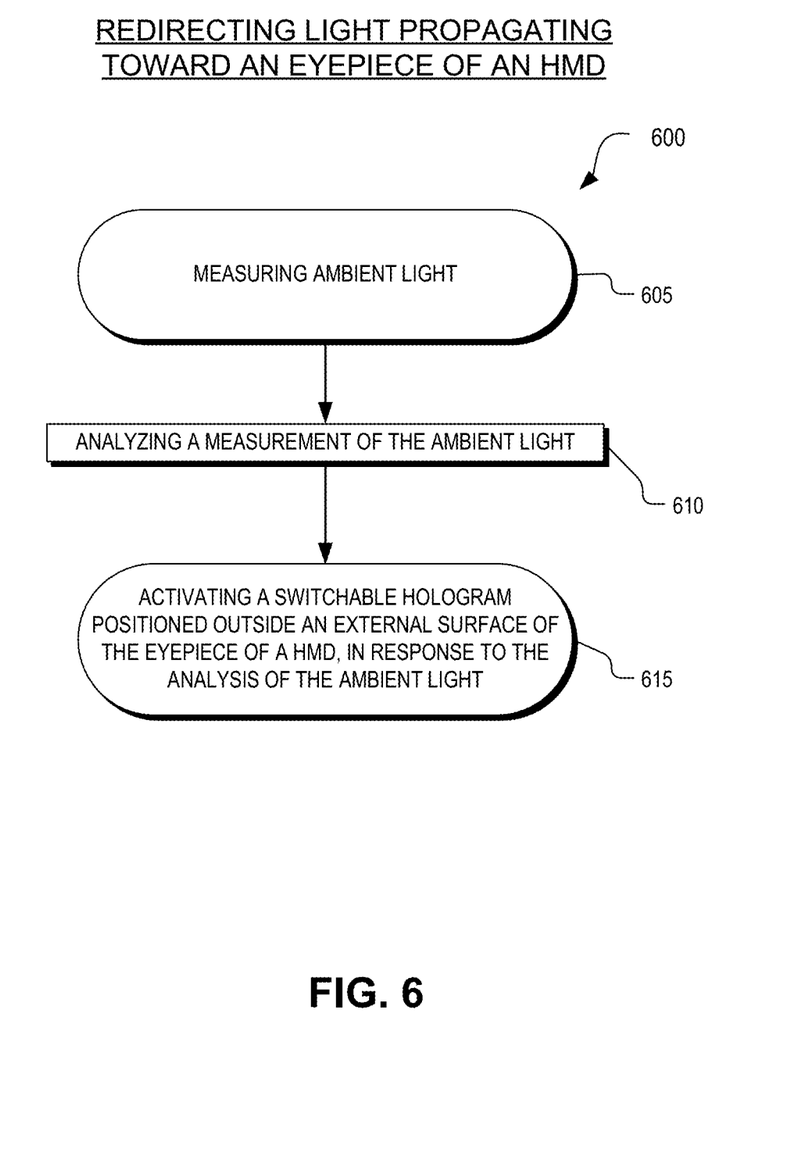
FIG. 6 illustrates a flow chart illustrating a method of redirecting light propagating toward an eyepiece of an HMD, in accordance with an embodiment of the disclosure.

FIG. 6 illustrates a flow chart illustrating a method of redirecting light propagating toward an eyepiece of an HMD, in accordance with an embodiment of the disclosure. In process block 605, ambient light (e.g. ambient light 390) is measured. The ambient light may be measured by light sensing module 440. Then, the measurement of the ambient light is measured in process block 610. The ambient light may be analyzed to determine if the ambient light included a threshold value of a specific visible spectrum (e.g. ultraviolet).

In process block 615, a switchable hologram (e.g. switchable hologram 333 or 533) is activated in response to the measurement of the ambient light. The switchable hologram is positioned outside an external surface of an eyepiece (e.g. eyepiece 300 or 500) of an HMD. The switchable hologram is configured to redirect at least a portion of ambient light that is propagating toward the eyepiece, when activated. In one example of redirecting the ambient light, the switchable hologram may be configured to divert a specific spectrum of ambient light away from an eye-ward region in response to the analysis that the ambient light includes a threshold value of the specific spectrum of ambient light. In one example of redirecting the ambient light, the switchable hologram may be configured to diffuse the ambient light propagating toward the eyepiece.

Activating the switchable hologram may include activating the switchable hologram at different activation level and the switchable hologram may be configured to modulate a level of diffusion of the switchable hologram in response to being activated at the different activation levels. The switchable hologram may include an H-PDLC layer as the active material. Optionally, a second switchable hologram may be activated in response to analyzing the ambient light. The second switchable hologram may also be positioned outside the external surface of the eyepiece of the HMD. Volume holograms can have a high polarization selectivity, and thus can act on a specific polarization of light, such as the polarization sun shades, in addition to the spectral and angular selectivity (Bragg selectivity). When trying to act on both polarizations of light, it is possible to use two sandwiched volume holograms and a broadband (or narrow band) quarter wave plate in between, so that both polarizations are processed when light goes through both holograms. More than two holograms may be used on a single surface, and holograms can be used in a multilayer configuration with or without quarter wave plates in between (sandwiched). Holograms can implement spectral filtering, light redirection (grating), diffusing, and focusing (lensing).

The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for a head mounted display ("HMD") comprising:
   a display module for launching computer generated image ("CGI") light along a forward propagating path;
   an eyepiece optically coupled to receive the CGI light and direct the CGI light to an eye-ward region of the eyepiece;
   a switchable hologram disposed along a surface of the eyepiece, wherein the switchable hologram is configured to redirect ambient light propagating toward the eyepiece, when activated;
   a controller coupled to the switchable hologram to activate and deactivate the switchable hologram; and
   a light sensing module coupled to the controller and positioned to sense the ambient light, wherein the controller is coupled to activate and deactivate the switchable hologram in response to ambient light data generated by the light sensing module.

2. The apparatus of claim 1 further comprising a second switchable hologram coupled outside the external surface of the eyepiece and coupled to be activated and deactivated by the controller, wherein the switchable hologram is configured to diffuse ambient light when activated, and wherein the second switchable hologram is configured to, when activated, divert a selected visible spectrum of the ambient light in a pattern that directs the selected visible spectrum of the ambient light away from the eye-ward region.

3. The apparatus of claim 2, wherein a transparent dielectric substrate is layered between the switchable hologram and the second switchable hologram.

4. The apparatus of claim 2, wherein the switchable hologram is coupled above a top side of the eyepiece.

5. The apparatus of claim 2, wherein the second switchable hologram is coupled in front of an external scene-side of the eyepiece.

6. The apparatus of claim 1, wherein the switchable hologram appears virtually transparent to visible spectrums of the ambient light, when the switchable hologram is deactivated.

7. The apparatus of claim 1, wherein the controller is coupled to activate the switchable hologram at different activation levels, and wherein the switchable hologram is configured to modulate a level of diffusion of the switchable hologram in response to the different activation levels.

8. The apparatus of claim 1, wherein the switchable hologram is configured to divert a selected spectrum of the ambient light away from the eye-ward region, when activated by the controller.

9. The apparatus of claim 8, wherein the controller is configured to activate the switchable hologram when a threshold value of the selected spectrum of the ambient light is measured by the light sensing module.

10. The apparatus of claim 8, wherein the selected spectrum of the ambient light includes ultraviolet light.

11. The apparatus of claim 1, wherein the switchable hologram includes holographic polymer dispersed liquid crystal ("H-PDLC").

12. A method of redirecting light propagating toward an eyepiece of a head mounted display ("HMD"), the method comprising:
    measuring ambient light;
    analyzing a measurement of the ambient light; and
    activating a switchable hologram in response to said analyzing the measurement of the ambient light, wherein the switchable hologram is positioned outside a surface of the eyepiece of the HMD, and wherein the switchable hologram is configured to, when activated, redirect at least a portion of the ambient light that is propagating toward the eyepiece.

13. The method of claim 12, wherein said analyzing the measurement includes determining if the measurement includes a threshold value of a specific spectrum of the ambient light, and wherein the switchable hologram is configured to divert the specific visible spectrum away from an eye-ward region.

14. The method of claim 13, wherein the specific spectrum includes ultraviolet light.

15. The method of claim 12, wherein the switchable hologram is configured to diffuse the ambient light.

16. The method of claim 15, wherein activating the switchable hologram includes activating the switchable hologram at different activation levels, and wherein the switchable hologram is configured to modulate a level of diffusion of the switchable hologram in response to being activated at the different activation levels.

17. The method of claim 12 further comprising activating a second switchable hologram in response to said analyzing the measurement of the ambient light, wherein the second switchable hologram is positioned outside the external surface of the eyepiece of the HMD, and wherein the second switchable hologram is configured to divert a specific visible spectrum of the ambient light away from the eye-ward region.

18. The method of claim 17, wherein a transparent dielectric substrate is layered between the switchable hologram and the second switchable hologram.

19. The method of claim 12, wherein the switchable hologram includes holographic polymer dispersed liquid crystal ("H-PDLC").

* * * * *